(12) United States Patent
Chen et al.

(10) Patent No.: US 11,709,913 B2
(45) Date of Patent: Jul. 25, 2023

(54) AUTOMATIC GENERATION SYSTEM OF TRAINING IMAGE AND METHOD THEREOF

(71) Applicant: DELTA ELECTRONICS, INC., Taoyuan (TW)

(72) Inventors: Tien-He Chen, Taoyuan (TW); Che-Min Chen, Taoyuan (TW); Jia-Wei Yan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/472,951

(22) Filed: Sep. 13, 2021

(65) Prior Publication Data

US 2022/0114392 A1 Apr. 14, 2022

Related U.S. Application Data

(60) Provisional application No. 63/091,857, filed on Oct. 14, 2020.

(30) Foreign Application Priority Data

Dec. 1, 2020 (CN) .......................... 202011389588.6

(51) Int. Cl.
  *G06K 9/62* (2022.01)
  *G06V 10/56* (2022.01)
  (Continued)

(52) U.S. Cl.
  CPC ...... *G06F 18/2148* (2023.01); *G06F 18/2193* (2023.01); *G06F 18/2415* (2023.01); *G06V 10/56* (2022.01)

(58) Field of Classification Search
  CPC .. G06K 9/6257; G06K 9/6265; G06K 9/6277; G06V 10/56
  See application file for complete search history.

(56) References Cited

U.S. PATENT DOCUMENTS

2008/0044801 A1* 2/2008 Modica .................. G09B 19/00
  434/307 R
2008/0170660 A1 7/2008 Gudmundson et al.
  (Continued)

FOREIGN PATENT DOCUMENTS

CN 109142374 A 1/2019
JP 2020149086 A 9/2020
  (Continued)

OTHER PUBLICATIONS

Wang, Qian, Najla Megherbi, and Toby P. Breckon. "A reference architecture for plausible threat image projection (TIP) within 3D X-ray computed tomography volumes." Journal of X-ray Science and Technology 28.3 (2020): 507-526. (Year: 2020).*
  (Continued)

*Primary Examiner* — David Perlman
(74) *Attorney, Agent, or Firm* — Chun-Ming Shih; HDLS IPR Services

(57) ABSTRACT

An automatic generation system of a training image and a method thereof are provided. The disclosure generates a training image and records the target category and the target position. The disclosure adds the target image to the container image as a candidate image, calculates a reliability of the candidate image, and repeatedly executes the process until the reliability of the candidate image meets a threshold condition for generating the training image. The disclosure is able to generate the training images automatically, and the recognition difficulty of the training image is adjustable by the user, so as to be suitable for customized recognition training.

14 Claims, 13 Drawing Sheets

(51) Int. Cl.
*G06F 18/214* (2023.01)
*G06F 18/21* (2023.01)
*G06F 18/2415* (2023.01)

(56) References Cited

U.S. PATENT DOCUMENTS

2022/0020203 A1* 1/2022 Paglieroni ............. G06T 7/0002
2022/0164990 A1 5/2022 Inoshita

FOREIGN PATENT DOCUMENTS

WO 2007131348 A1 11/2007
WO 2020195015 A1 10/2020

OTHER PUBLICATIONS

Michel, Stefan, Marcia Mendes, and Adrian Schwaninger. "Can the difficulty level reached in computer-based training predict results in x-ray image interpretation tests?." 44th Annual 2010 IEEE International Carnahan Conference on Security Technology. IEEE, 2010. (Year: 2010).*

Office Action dated Dec. 2, 2021 of the corresponding Taiwan patent application No. 109142187.
Adrian Schwaninger: "Increasing Efficiency in Airport Security Screening", AVSEC World 2004, Nov. 3, 2004, XP055009005, Retrieved from the Internet: URL:https://irf.fhnw.ch/bitstream/handle/11654/3369/Schwaninger2004a.pdf?sequence=1 section 3.1, 3.2,4; Figs. 6, 7.
Tripathi Shashank et al: "Learning to Generate Synthetic Data via Compositing", arxiv.org, Jul. 8, 2019, pp. 1-19, XP055896887, Retrieved from the Internet: URL:https://arxiv.org/pdf/1904.05475.pdf [retrieved on Mar. 2, 2022] abstract; section 3; pp. 12-14; Fig. 1.
Nang Keze et al: "Dictionary Pair Classifier Driven Convolutional Neural Networks for Object Detection", 2016 IEEE Conference on Computer Vision and Pattern Recognition (CVPR), IEEE, Jun. 27, 2016, pp. 2138-2146, XP033021393, [retrieved on Dec. 9, 2016] section 4.1, 4.3; Fig. 1.
Song-Hai Zhang et al: "What and Where: A Context-based Recommendation System for Object Insertion", arxiv.org, Nov. 24, 2018, XP081054052, Retrieved from the Internet: URL:https://arxiv.org/pdf/1811.09783.pdf section III.
Search Report dated Mar. 14, 2022 of the corresponding European patent application No. 21196786.4.
Office Action dated Sep. 6, 2022 of the corresponding Japan patent application No. 2021-155566.

* cited by examiner

AUTOMATIC GENERATION SYSTEM OF TRAINING IMAGE AND METHOD THEREOF

CROSS-REFERENCE TO RELATED APPLICATION

This patent application claims the benefit of U.S. Provisional Patent Application No. 63/091,857, filed Oct. 14, 2020, which is incorporated by reference herein.

BACKGROUND OF THE DISCLOSURE

Field of the Disclosure

The technical field relates to a training image, and more particularly relates to an automatic generation system of a training image and the method thereof.

Description of Related Art

A large number of samples (training images) are needed in order to implement the object recognition training for Artificial Intelligence (AI) or professional inspectors (such as customs officers for contraband inspection), but these samples are difficult to obtain.

To solve the above-mentioned problem, a related-art method of automatically generating samples is provided. The method is to generate a large number of samples through machine learning or random number for training.

However, the performance of object recognition training is closely related to the quality of the samples provided for training, once the qualities of the samples are not uniform (for example, the differences between the samples are overly huge or overly insignificant, or the level of recognition difficulty of the object in the sample is too difficult or too easy), the result of training is poor, the machine learning model or the inspectors may thus only recognize the same type of samples.

For example, when training is provided only with the samples of low difficulty (such as the target is different from the other objects), it is possible that the machine learning model or the inspectors recognize only the samples of low difficulty, and are unable to recognize the samples of high difficulty (such as the target is similar to the other objects).

It is unable to adjust the recognition difficulty of the samples generated by the related-art methods based on the user's demand, and thus the related-art methods are not suitable for training.

Thus, the method of automatically generating samples in the related art have the above-mentioned problems, there is a need for a more effective solution.

SUMMARY OF THE DISCLOSURE

The disclosure provides an automatic generation system of a training image and a method thereof for adjusting the recognition difficulty of the generated training images.

One of the exemplary embodiments, an automatic generation method of a training image, comprises: a) acquiring a plurality of container images and selecting one of the container images to execute a target-adding process to generate a training image, wherein the target-adding process includes: a1) acquiring a target images; a2) adding the target image to the selected container image as a candidate image; a3) computing a reliability of the candidate image, wherein the reliability corresponds to a recognition difficulty of the target image in the candidate image; and, a4) repeatedly performing the step a1) to the step a3) until the reliability of the candidate image meets a threshold condition for generating the training image; and, b) recording the training image and a target data, wherein the target data includes at least one of a target category and a target position of the target image.

One of the exemplary embodiments, an automatic generation system of a training image, the automatic generation system comprises: a container image source, including a plurality of container images; a target image database, including a plurality of target images; and, a control module, electrically connected to the container image source and the target image database, the control module including: a target-adding module, configured to select one of the container images to execute a target-adding process to generate a training image, wherein the target-adding process includes adding the target image to the selected container image as a candidate image; a target-recording module configured to record the training image and a target data, wherein the target data includes at least one of a target category and a target position of the target image; and, a reliability-calculating module, configured to compute a reliability of the candidate image; wherein the control module is configured to repeatedly execute the target-adding process by the target-adding module until the reliability of the candidate image meets a threshold condition for generating the training image; wherein the reliability corresponds to a recognition difficulty of the target image in the candidate image.

One of the exemplary embodiments, a method of automatically generating training images, comprises: a) acquiring a container image; b) acquiring a target image; c) adding the target image to the container image as a candidate image; d) computing a reliability of the candidate image, wherein the reliability corresponds to recognition difficulty of recognizing the target image in the candidate image; and, e) repeatedly performing the step b) to the step d) until the reliability of the candidate image meets the threshold condition for generating a training image.

The disclosure may generate the training images automatically, and the recognition difficulty of the training image is adjustable by the user, so as to be suitable for customized recognition training.

BRIEF DESCRIPTION OF DRAWINGS

The features of the disclosure believed to be novel are set forth with particularity in the appended claims. The disclosure itself, however, may be best understood by reference to the following detailed description of the disclosure, which describes an exemplary embodiment of the disclosure, taken in conjunction with the accompanying drawings, in which:

DETAILED DESCRIPTION OF THE DISCLOSURE

In cooperation with the attached drawings, the technical contents and detailed description of the disclosure are described thereinafter according to some embodiments, being not used to limit its executing scope. Any equivalent variation and modification made according to appended claims is all covered by the claims claimed by the disclosure.

During the training of an object recognition, the computer system or the user needs to recognize the training image including a target image (the object image, such as contraband or the other designated objects) from a large number of images, and the recognition difficulty of the target image is non-adjustable in the related-art.

The disclosure presents the automatic generation system of the training images and the method thereof. In the system and the method, the recognition difficulty (reliability threshold condition) is adjustable, and the system and the method may generate the training image(s) consistent with the recognition difficulty, so as to provide the object recognition training in different difficulty levels.

Figure 1:
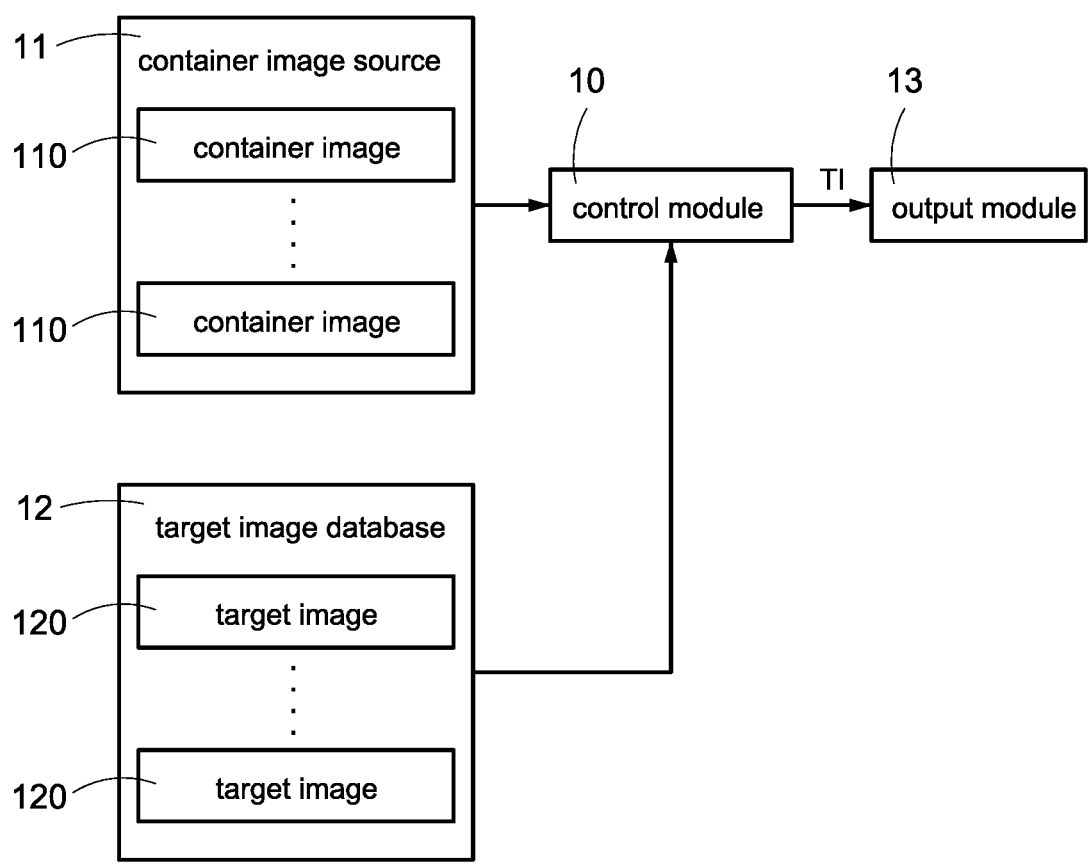
FIG. 1 is an architecture diagram of the automatic generation system according to one embodiment of the disclosure.
Figure 2:
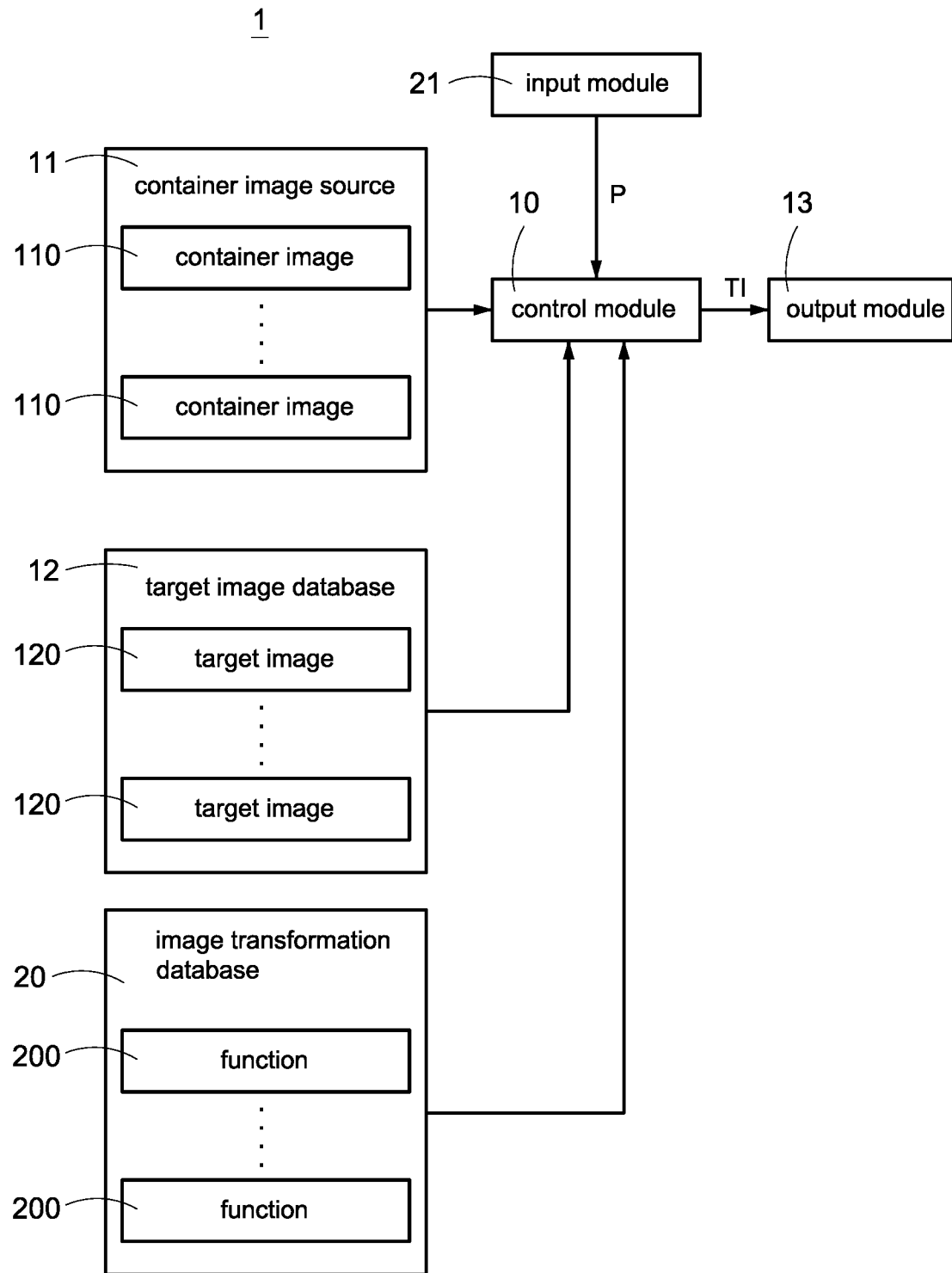
FIG. 2 is an architecture diagram of the automatic generation system according to another embodiment of the disclosure.

Please refer to FIG. 1 and FIG. 2, the automatic generation system 1 of the training images may include a container image source 11, a target image database 12, an output module 13, and a control module 10 electrically connected to the above devices.

The container image source 11 is used to acquire a plurality of container images 110. The container images 110, such as the images of suitcases, handbags, shopping carts, baskets, or the other containers for accommodating things, are original images without processing. The accommodation space of each of the container images 110 may be empty or contain some objects (hereinafter referred to as the original objects, such as cosmetics, 3C products, commodities, goods, or the other things for being put in the container).

The target image database 12 is used to store a plurality of target images 120. The target images 120 are the images of the target needed to be recognized in the object recognition training. For example, the images of the contraband (pistols, knives, drugs, batteries, etc.), or the other designated objects. The target images 120 may be real images of the contraband.

The output module 13, such as the display module 32, the storage module 40 or the network transmission interface 41 described hereinafter, may be used to output the images (such as storing, displaying, or transmitting to another computer). The control module 10 (such as CPU, GPU, processor, controller, SoC, etc.) is used to control the automatic generation system 1 to automatically produce and output the training images TI (described hereinafter).

Please refer to FIG. 2, in one of the exemplary embodiments, the automatic generation system 1 may include an image transformation database 20 and an input module 21 electrically connected to the control module 10.

The image transformation database 20 stores multiple types of functions 200 (functional algorithm), each function 200 is used to execute different image-transforming processes on the image, such as rotating, flipping, deforming, adjusting brightness, adjusting color saturation, adjusting contrast, low-pass filtering, high-pass filtering, moving up one layer, moving down one layer and the other image processes, to change the attributes (such as a shape, a brightness, a color, a posture and/or a stacking order) of the image.

The input module 21, such as keyboard, mouse, touchpad, touch screen, microphone, etc., is used for the user to input and operate. For example, the user may use the input module 21 to modify some of the parameters P corresponding to the recognition difficulty of the generated training images.

Figure 3:
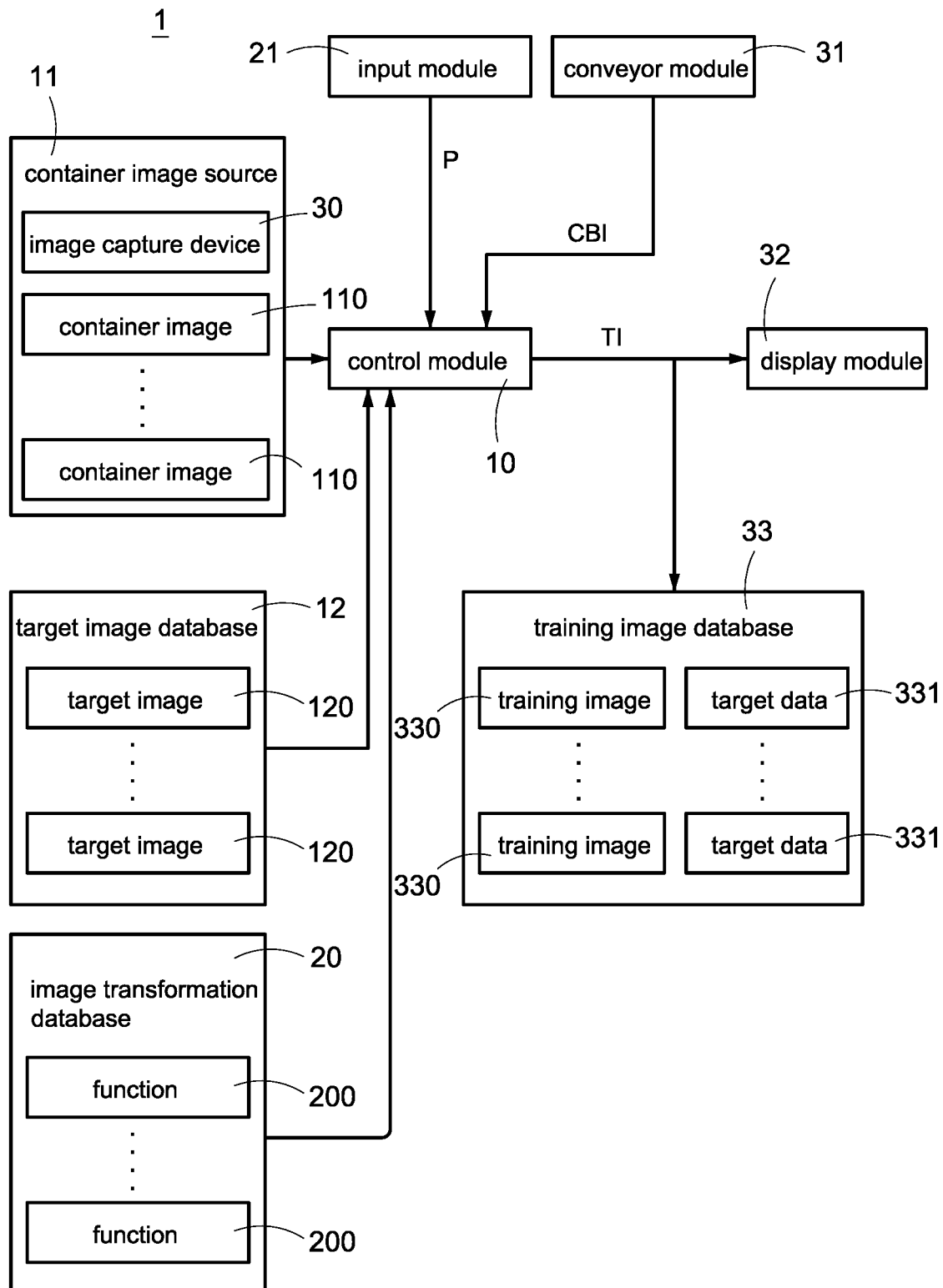
FIG. 3 is an architecture diagram of the automatic generation system according to another embodiment of the disclosure.

Please refer to FIG. 3, in one of the exemplary embodiments, the container images source 11 may include an image capture device 30 (such as visible light camera, X-ray scanner, ultrasonic scanner, thermal camera, etc.) used to capture the container images 110 (such as a photo, a radiographic image like X-ray image, ultrasonic image, thermal image, etc.) from the physical containers.

Please be noted that each pixel value of the images may be related to the object depth or material density corresponding to each pixel when the container images 110, the target images 120 and the training images TI are radiographic images. Then the control module 10 may color each pixel of the images based on the pixel values. For example, some pixels of the images corresponding to different depths or material densities may be colored with the different colors, and some pixels corresponding to the identical or similar depth or material density may be colored with the same color.

Moreover, the target images 120, the container images 110 and the training images TI are the same type of image, such as radiographic images.

In one of the exemplary embodiments, the automatic generation system 1 may include a display module 32, such as LCD (Liquid-Crystal Display), projectors, or the other displays, electrically connected to the control module 10. The display module 32 is used to display images and information.

In one of the exemplary embodiments of the present disclosure, the automatic generation system 1 may include a training image databased 33 electrically connected to the control module 10. The training image database 33 may store the training images TI (namely, the training images 330) and the target data 331 thereof. The target data 331 may include the answer or suggestion of the training image 330 or the target category or the target positions of the target image 120 added or merged in the training image 330.

In one of the exemplary embodiments, the automatic generation system 1 may include the conveyor module 31 electrically connected to the control module 10, the control module 10 may acquire the (real-time) conveyor information CBI of the conveyor module 31 to simulate the recognition training of real-time object delivery inspection (described hereinafter).

Figure 4:
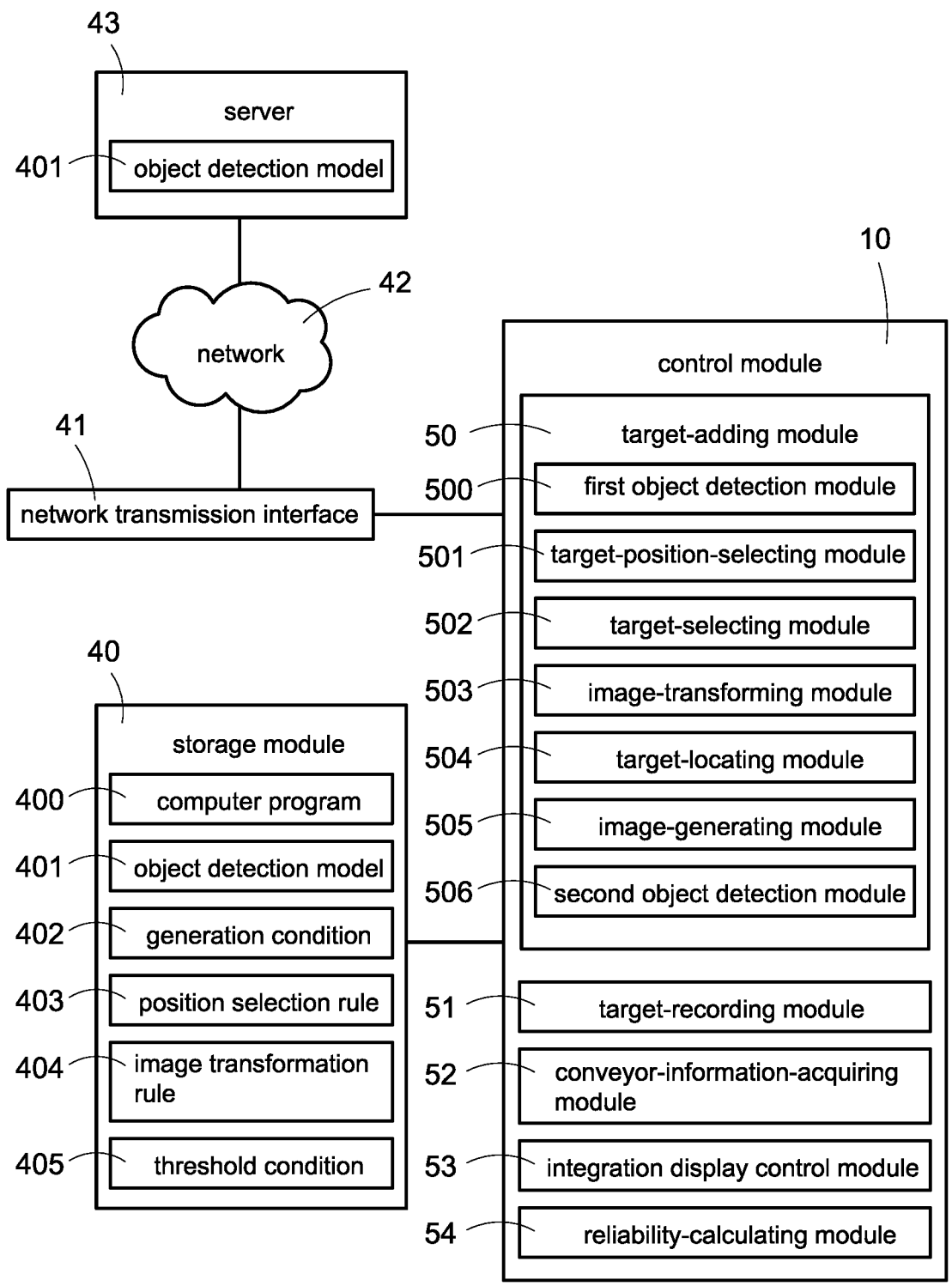
FIG. 4 is a partial architecture diagram of the automatic generation system according to another embodiment of the disclosure.

Please refer to FIG. 4, in one of the exemplary embodiments, the automatic generation system 1 may include a storage module 104, such as hard disk drive, flash memory, RAM, ROM, etc., electrically connected to the control module 10 and used to store data.

In one of the exemplary embodiments, the automatic generation system 1 may include a network transmission interface 41, such as Wi-Fi network module, Ethernet network module, cellular network module, etc., electrically connected to the control module 10. The network transmission interface 41 is used to connect to the network 42 (such as the Internet or local area network), and is connected to the remote server 43 through the network 42.

In one of the exemplary embodiments, one or multiple of the container image sources 11, the target image database 12, the image transformation database 20 and the training image database 33 may be a network database, and the control module 10 is configured to access the data in the network databases through the network transmission interface 41.

In one of the exemplary embodiments, the control module 10 may include the modules 50-54 and 500-506 to implement the different functions described in detailed hereinafter. Please be noted that, the above-mentioned modules 50-54 and 500-506 are connected to each other (such as by electrical connection or informational link), and any one of the modules 50-54 and 500-506 may be a hardware module (such as electronic circuit module, integrated circuit module, SoC, etc.), a software module (such as firmware, operating system, or application program) or a combination of the hardware module and the software module, here is not intended to limit the scope of the disclosure.

Please be noted that if any one of the above-mentioned modules 50-54 and 500-506 is the software module, the storage module 40 may include a non-transitory computer-readable medium. The non-transitory computer-readable medium stores a computer program (such as the computer program 400). The computer program 400 records a plurality of computer-executable codes. When the control module 10 executes the above computer-executable codes, the control functions of the corresponding one of the modules 50-54 and 500-506 may be achieved.

Figure 5:
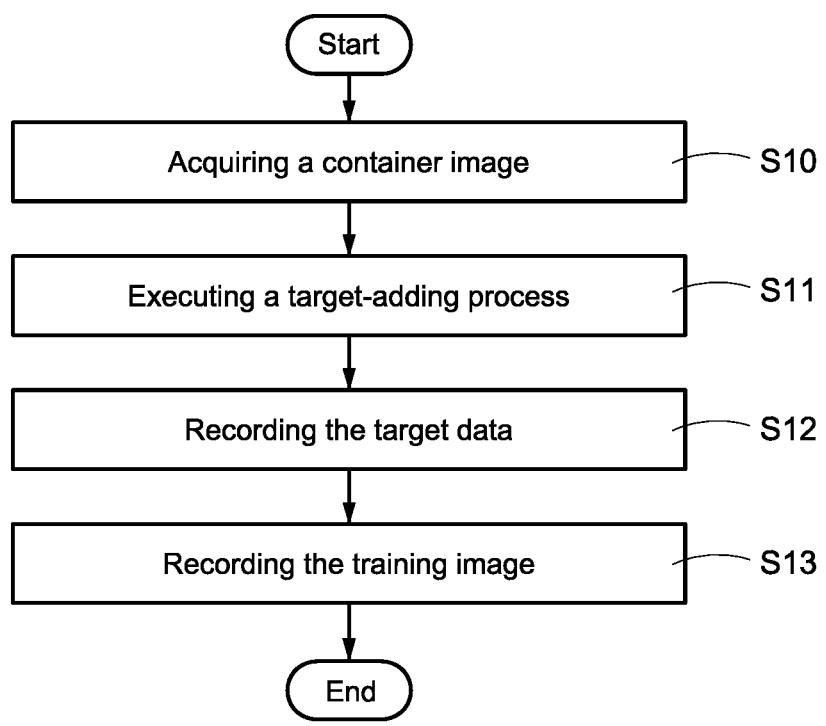
FIG. 5 is a flowchart of the automatic generation method according to the first embodiment of the disclosure.

Please refer to FIG. 5. The automatic generation method of the training image of the disclosure may include the following steps.

Step S10: the control module 10 may acquires a plurality of container images 110 in sequence through the container image source 11 based on a baggage transmitting order, here is not intended to be limiting.

Step S11: the control module 10 selects at least one of the container images 110 to execute a target-adding process through the target-adding module 50 to generate the training image TI including the target image 120.

In one of the exemplary embodiments, the storage module 40 stores a generation condition 402. The control module 10 selects a part of the container images 110 based on the generation condition 402, and executes the target-adding process on the selected container image 110.

For example, the generation condition 402 may be the probability of generating the training image TI (such as 0.1%, 10%, 50%, and so on), the total amount of the training images TI (such as one, two, or one hundred training images TI), the relationship (such as the number of the container images 110 intervening between the two adjacent training images TI, such as intervening with 10, 50, or 100 images) and so on, here is not intended to limit the scope of the disclosure.

In one of the exemplary embodiments, the user may modify some of the parameters P to adjust the generation condition 402 for changing the recognition difficulty of the generated training images.

The disclosure may train the concentration of the user via executing the target-recognizing training by randomly displaying the container images and the training images TI to improve training performance. Moreover, the disclosure may adjust the occurrence or frequency (generation condition 402) of the training images TI to change the concentration level.

Figure 6:
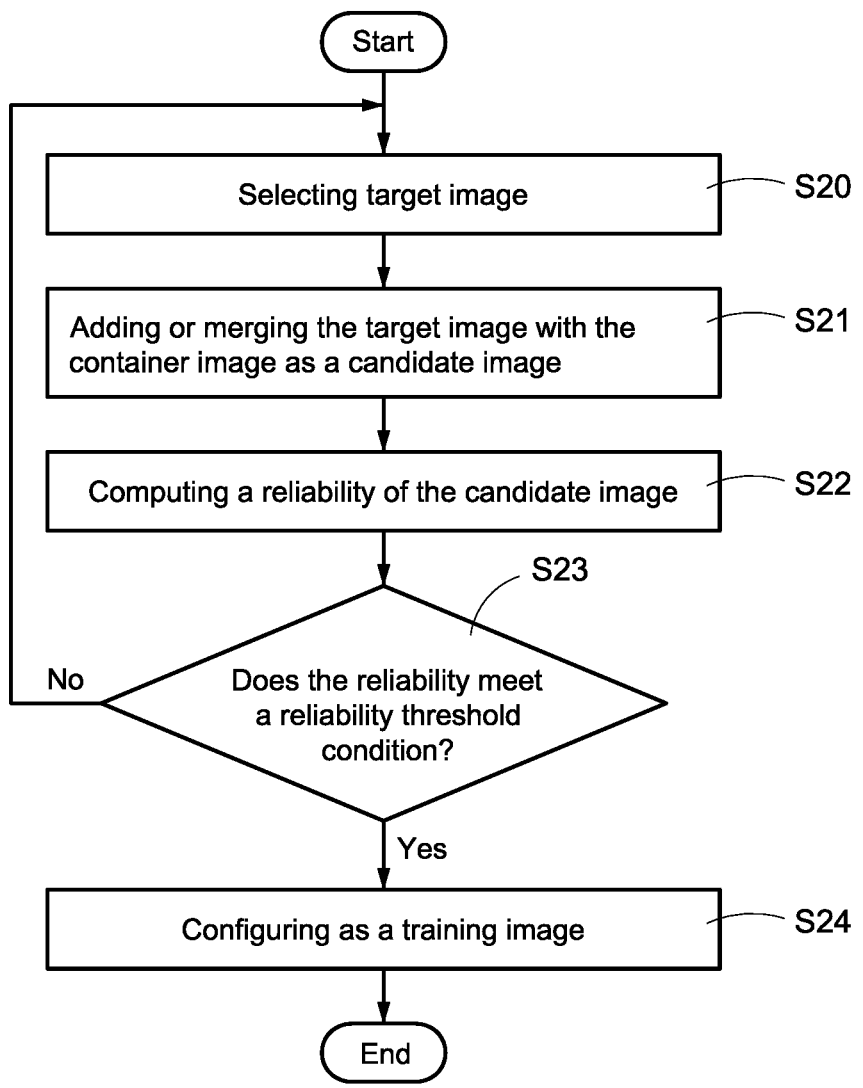
FIG. 6 is a partial flowchart of the automatic generation method according to the second embodiment of the disclosure.

In one of the exemplary embodiments, please refer to FIG. 6, the target-adding process of the disclosure may include the following steps.

Step S20: the control module 10 uses the target-selecting module 502 to select one or more target images 120 from the target image databases 12. The above-mentioned selection may be the manual selection made by the user through the input module 21, or the automatic selection made by the target-selecting module 502. For example, the target-selecting module 502 may select randomly or based on the rules configured in advance, such as selecting the suitable (number or size) target image 120 based on the size of the remaining space of the container image 110, or selecting the target image 120 having the corresponding difficulty based on the recognition difficulty configured in advance.

Step S21: the control module 10 uses the target-adding module 50 to add or merge each selected target image 120 with the selected container image 110 at the target position (the expected generation position) as a candidate image. The above-mentioned target position may be configured automatically selected by the target-adding module 50, here is not intended to limit the scope of the disclosure. The candidate image is a virtual image.

Step S22: the control module 10 uses the reliability-calculating module 54 to compute a reliability (namely, the reliability score) of the generated candidate image. The above-mentioned reliability corresponds to a recognition difficulty of the target image 120 in the candidate image. That is, the difficulty of recognizing the target data of the target image 120 in the candidate image based on the similarity, the contrast, or other factors so forth between the target image 120 and the surrounding images.

Step S23: the control module 10 determines whether the reliability of the candidate image meets the predetermined reliability threshold condition (hereinafter referred as threshold condition 405).

In one of the exemplary embodiments, if higher reliability refers to higher recognition difficulty, the control module 10 may determine that the reliability of the candidate image meets the threshold condition 405 when the reliability of the candidate image is greater than or equal to the predetermined threshold. Then the candidate image is qualified to be the training image. In one of the exemplary embodiments, if lower reliability refers to higher recognition difficulty, the control module 10 may determine the reliability of the candidate image meets the threshold condition 405 when the reliability of the candidate image is less than or equal to the predetermined threshold. Then the candidate image is qualified to be the training image.

In one of the exemplary embodiments, the control module 10 may determine that the reliability of the candidate image meets the threshold condition 405 when the reliability of the candidate image is within the threshold range, so as to make the recognition difficulties of the virtual training images TI be stable.

When the reliability of the candidate image does not meet the threshold condition 405, the control module 10 repeatedly performs the steps S20-S22 again to re-generate a new candidate image until the reliability of the generated candidate image meets the threshold condition 405.

In one of the exemplary embodiments, the user may modify some of the parameters P to adjust the threshold condition 405 for changing the recognition difficulty of the generated training images.

In one of the exemplary embodiments, when a plurality of target images 120 are added to the same container image 110, the reliability-calculating module 54 respectively calculates the reliability of each target image 120 in the candidate image. Moreover, the control module 10 re-executes the target-adding process until the reliability of each target image 120 of the candidate image meets the threshold condition 405.

When the reliability meets the threshold condition 405, the control module 10 performs the step S24: the control module 10 configures the candidate image as the training image TI, and finishes the target-adding process.

Please refer to FIG. 5, after the execution of the target-adding process, the step S12 is performed: the control module 10 may acquire the target data 331 through the target-locating module 504, and records the target data 331 related to each target image 120 within each training image TI in the training image database 33 through the target-recording module 51. The target data 331 may include the target category and/or the target position of the target image in the container image.

In one of the exemplary embodiments, the step S13 may be further performed: the control module 10 records each training image TI, i.e., the training image 330, in the training image database 33 through the target-recording module 51.

In one of the exemplary embodiments, the target-recording module 51 is configured to associate each training image with the corresponding target data 331, and records those in the training image database 33.

Figure 7:
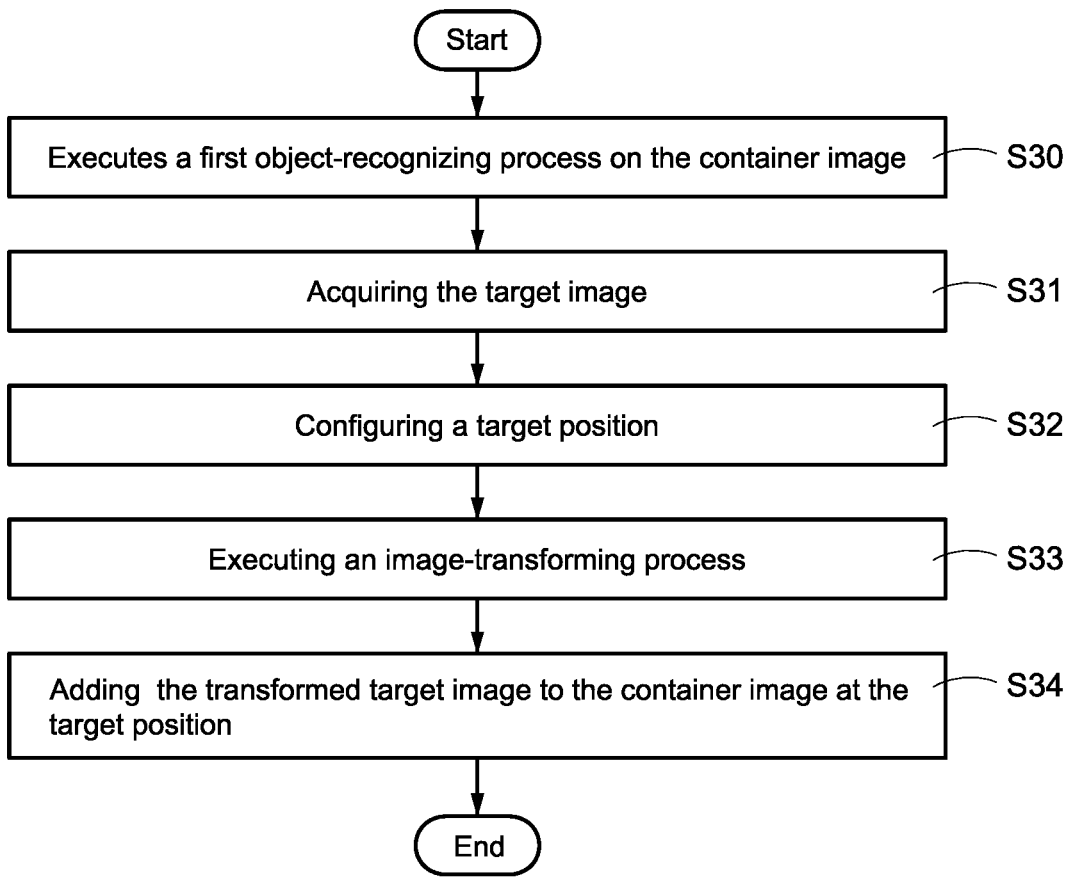
FIG. 7 is a partial flowchart of the automatic generation method according to the third embodiment of the disclosure.

Please refer to FIG. 7, in one of the exemplary embodiments, the above-mentioned step S21 of adding or merging the target image 120 with the container image 110 may include the following steps.

Step S30: the control module 10 executes the first object-recognizing process on the container image 110 through the first object detection module 500 to detect the object position of each original object of the container image 110 which is not added with the target image 120.

In one of the exemplary embodiments, the first object detection module 500 may acquire the object detection model 401, the object detection model 401 may be stored in the storage module 40 or the server 43 in the cloud (namely, cloud computing). The object detection model 401 is established in advance by machine learning or deep learning (e.g., YOLO, Fast-RCNN, Faster-RCNN etc.). The first object detection module 500 is configured to execute the first object recognizing process on the container image 110 based on the object detection model 401.

Step S31: the control module 10 acquires the target image 120 from the target image database 12 through the target-selecting module 502.

Step S32: the control module 10 configures the target position of each selected target image 120 in the container image 110 based on the position selection rule 403 through the target-position-selecting module 501.

In one of the exemplary embodiments, the above-mentioned position selection rule 403 may be stored in the storage module 40. Moreover, the user may modify some of the parameters P to adjust the position selection rule 403 for changing the recognition difficulty of the generated training images, such as overlapping the target image 120 with the original object to increase the difficulty or placing the target image 120 at the position with no original object to reduce the difficulty.

In one of the exemplary embodiments, the above-mentioned position selection rule 403 may include: at least a part of the target position is coinciding or overlapping with at least a part of the object position, an area of the target position is equal to or greater than a size of the target image, and/or the area of the target position is larger than a size of the original object, here is not intended to limit the scope of the disclosure.

Step S33: the control module 10 selects at least one function 200 from the image transformation database 20 to execute the image-transforming process on the target image 120 based on the image transformation rule 404 through the image-transforming module 503.

In one of the exemplary embodiments, the above-mentioned image-transforming process is to change the shape, the brightness, the color, the posture, the stacking order (namely the overlapping relation between the target image 120 and the other original objects), and/or the other image attributes of the target mage 120.

In one of the exemplary embodiments, the above-mentioned image transformation rule 404 may be stored in the storage module 40. Moreover, the user may modify some of the parameters P to adjust the image transformation rule 404 for changing the recognition difficulty of the generated training images, such as increasing the similarity between the target image 120 and the surrounding images to increase the difficulty, or reducing the similarity between the target image 120 and the surrounding images to reduce the difficulty.

In one of the exemplary embodiments, the above-mentioned image transformation rule 404 includes: the function 200 is selected based on the target category of the target image 120, the function 200 is selected based on the image difference between the container image 110 and the target image 120, the function 200 is selected based on the target position and the other object's position, and so on, here is not intended to limit the scope of the disclosure.

Step S34: the control module 10 adds the target image 120 being transformed by at least one image-transforming process to the container image 110 at the target position through the image-generating module 505, so as to complete the adding of the target image 120 to the container image 110.

The disclosure may effectively adjust the recognition difficulty of the generated training images by modifying some of the parameters P corresponding to the generation condition 402, the position selection rule 403, the image transformation rule 404 and/or the threshold condition 405.

Figure 8:
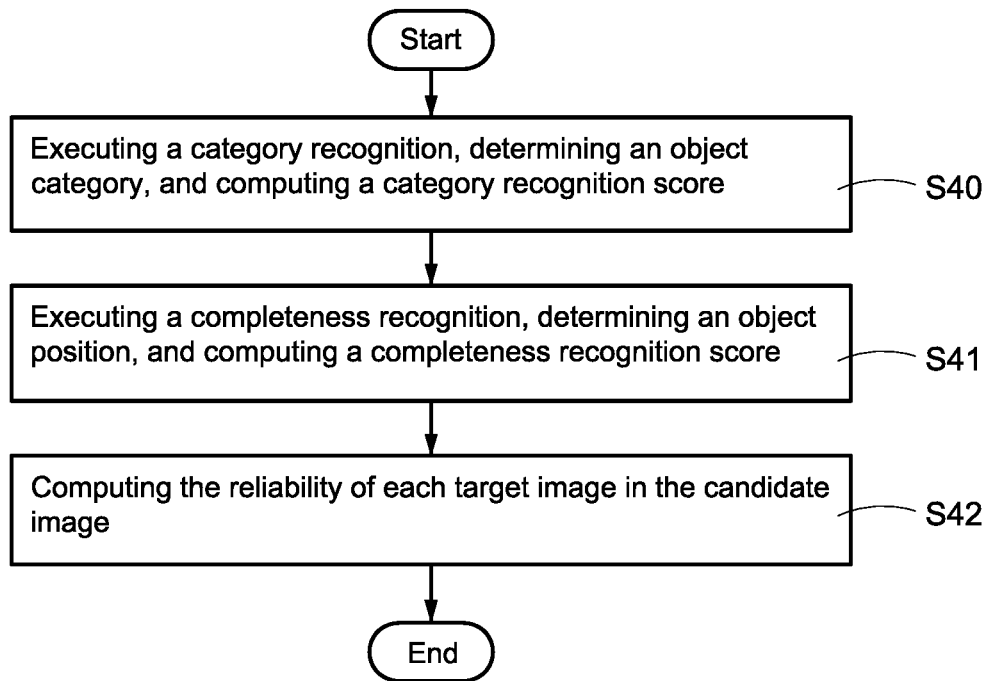
FIG. 8 is a partial flowchart of the automatic generation method according to the fourth embodiment of the disclosure.

Please refer to FIG. 8, the control module 10 may execute the second object-recognizing process on the candidate image to obtain a category recognition score and a completeness recognition score of each target image of the candidate image through the reliability-calculating module 54, and calculate the reliability according to the scores. The above-mentioned category recognition score corresponds to a probability of the target category being correctly recognized, and the above-mentioned completeness recognition score corresponds to a probability of the target position being correctly recognized.

More specifically, the above-mentioned step S22 of calculating the reliability may include the following steps S40-S42 of second object-recognizing process.

Step S40: the control module 10 executes a category recognition respectively on a plurality of image blocks of the input image (such as the candidate image) through the second object detection module 506 to determine the probability (first probability) of each object category (such as target category) corresponding to each image block on the object image (such as target image), determines the object category with the highest first probability (namely, setting the object category of the image block), and computes the category recognition score based on the highest first probability (namely, computing the reliability of the image block belonging to the object category).

Figure 12:
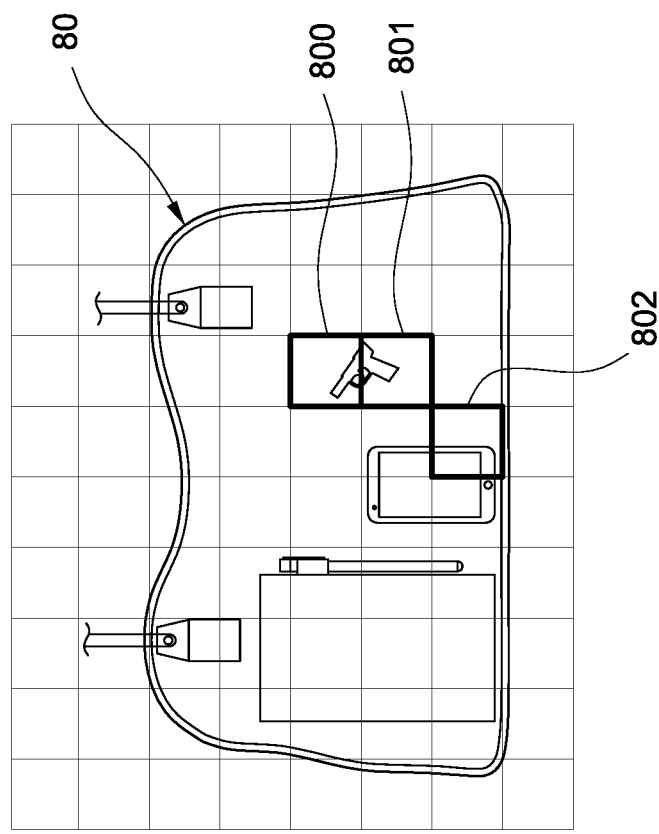
FIG. 12 is a first schematic view of the object recognition according to one embodiment of the disclosure.

Please refer to FIG. 12, the candidate image 80 (a baggage image in this example) may be divided into a plurality of image blocks. The control module 10 may use the object detection model 401 to execute the category recognition on each of image blocks. For example, a recognition result of the image block 800 is "pistol in a probability of 75% (the highest first probability of the image block 800); luggage in a probability of 5%", a recognition result of the image block 801 is "pistol in a probability of 60% (the highest first probability of the image block 801); cellphone in a probability of 10%", and a recognition result of the image block 802 is "cellphone in a probability of 70% (the highest first probability of the image block 802); the base of luggage in a probability of 20%".

Then, the control module 10 may determine that the image block 800 shows a pistol (the category recognition score is 0.75), the image block 801 shows the pistol (the category recognition score is 0.6), and the image block 802 shows a cellphone (the category recognition score is 0.7). Thus, the calculation of the category recognition score of each image block is finished.

Please refer to FIG. 8, the step S41: the control module 10 executes a completeness recognition on a plurality of ranges of the input image (such as the candidate image) through the second object detection module 506 to determine a probability (second probability) of each range fully covering an object image (such as the target image), determines an object position (such as the target position) of the object image based on the highest second probability (namely, setting a most suitable range of this object), and computes a completeness recognition score based on the highest second probability (namely, computing the reliability of the range fully covering the object).

Figure 13:
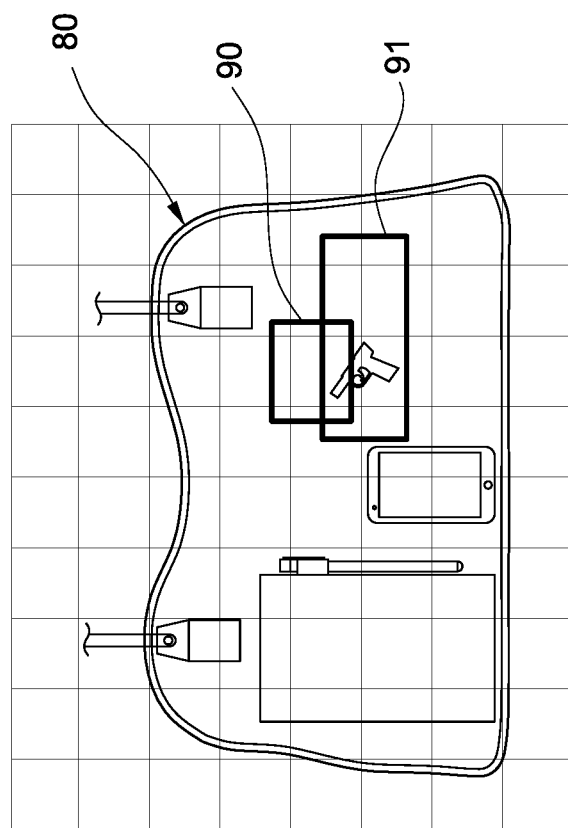
FIG. 13 is a second schematic view of the object recognition according to one embodiment of the disclosure.

Please refer to FIG. 13, the control module 10 may designate and select the multiple ranges 90-91 in the candidate image 80, and execute the completeness recognition on each of ranges by using the object detection model 401. For example, a recognition result of the range 90 is "fully covering a pistol in a probability of 60%", and a recognition result of the range 91 is "fully covering a pistol in a probability of 70%". Namely, the second probability of the range 91 is the highest.

Then, the control module 10 may determine that the completeness recognition score of the range 90 fully covering the pistol is 0.6, and the completeness recognition score of the range 91 fully covering the pistol is 0.7.

Please refer to FIG. 8, step S42: the control module 10 computes the reliability of each target image in the candidate image based on the category recognition score and the completeness recognition score of the target image through the reliability-calculating module 54. Any one of weighted average, addition, multiplication, and so on may be used in the calculation, here is not intended to limit the scope of the disclosure.

In one of the exemplary embodiments, the control module 10 may calculate the reliability according to the following equation 1:

$$\text{Reliability} = \text{Pr}(\text{Class}|\text{Grid}) * \text{Pr}(\text{Object}) \quad \text{(equation 1)}$$

Pr(Class|Grid) is the category recognition score, and Pr(Object) is the completeness recognition score.

Figure 14:
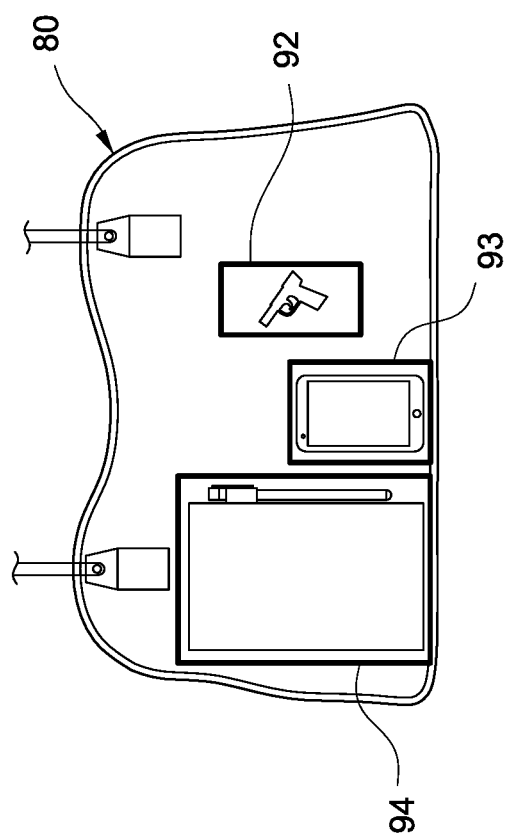
FIG. 14 is a third schematic view of the object recognition according to one embodiment of the disclosure.

Please refer to FIG. 14, after the execution of the above-mentioned steps S40-S44, the control module 10 may obtain all of the reliabilities (the recognition difficulty) of all the targets in the container image 80, such as the reliability of the target image 92 (pistol) is 0.85, the reliability of the original object 93 (cellphone) is 0.85, and the reliability of the target image 94 (notebook) is 0.95. Moreover, the control module 10 may determine whether the reliability of the target image 92 (such as the contraband) meets the pre-set threshold condition, such as 0.7, 0.9, 0.95, a range of 0.7-0.95 or a range of 0.8-0.9, and so on.

Please be noted that the above-mentioned first object detection module 500 (mentioned in the step S30) may be configured to execute the second object-recognizing process mentioned in the steps S40-S42 on each original object in the container image 110 for recognition and positioning.

Figure 9:
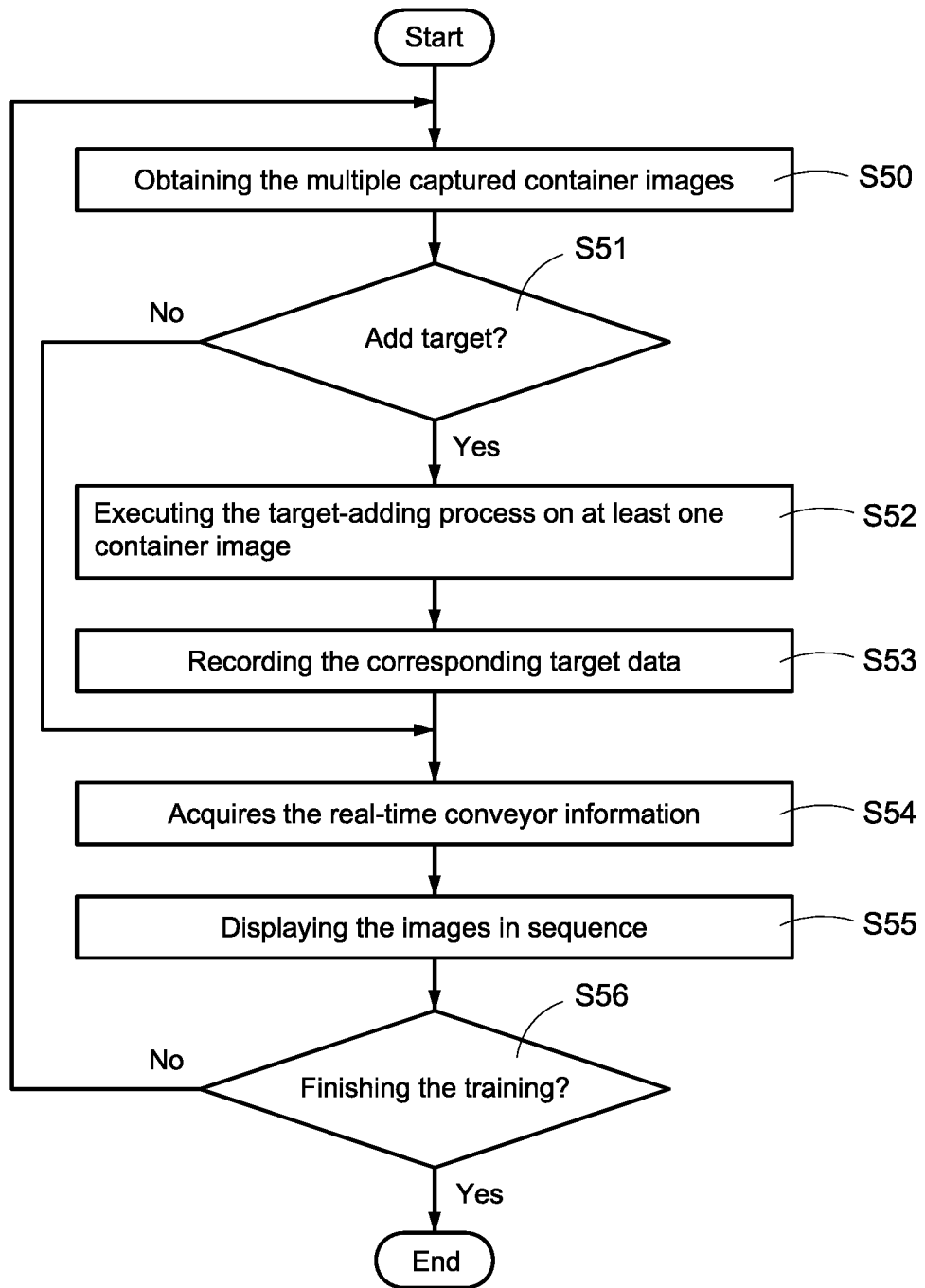
FIG. 9 is a flowchart of the automatic generation method according to the fifth embodiment of the disclosure.

In one of the exemplary embodiments, please refer to FIGS. 3 and 9, the disclosure may provide the recognition training of real-time object delivery inspection (such as the luggage/baggage inspection in customs).

The automatic generation system 1 may include a conveyor module 31 electrically connected to the control module 10. The conveyor module 31 is used to transport the containers (such as luggage). The image capture device 30 (such as X-ray capture apparatus, X-ray machine) arranged on the fixed position may capture the image of the containers transported by the conveyor module 31 one by one to obtain the container images 110 (such as X-ray radiographic images) of the different luggage in sequence.

Then, during the recognition training, the control module 10 obtains the multiple captured container images 110 in sequence (step S50), selects part of the container images based on the pre-set generation condition 402 for adding the target image 120 to obtain the training image TI (steps S51 and S52), and records the corresponding target data (step S53).

Moreover, the control module 10 acquires the real-time conveyor information CBI of the conveyor module 31 through the conveyor-information-acquiring module 52 (step S54), combines the container images 110 and the training image TI with the real-time conveyor information CBI to display the images in sequence on the display module 32 through the integration display control module 53 (step S55), and determines whether to finish the training (step S56).

In one of the exemplary embodiments, the integration display control module 53 is configured to control the display module 32 to scroll and display the container images and training image (similar to the display method of the electronic scroll) based on the obtained order of the container images 110 and the training image.

In one of the exemplary embodiments, the scrolling speed is determined based on a delivery speed recorded in the real-time conveyor information. For example, the faster the delivery speed, the faster the scrolling speed, namely, the display time of each image staying on the screen is shorter, and the available time for the user to recognize the image is shorter; the slower the delivery speed, the slower the scrolling speed, namely, the display time of each image staying on the screen is longer, and the available time for the user to recognize the image is longer.

In one of the exemplary embodiments, the control module 10 does not directly combine the target image 120 with the container image 110 into a single image, but displays the target image 120 and the container image 110 on the same display screen simultaneously to implement the training image.

More specifically, the control module 10 may continuously compute the latest (newest) display position of the target image 120 according to the real-time conveyor information, the container image 110 and the target position. When the container image 110 is scrolled and displayed, the control module 10 simultaneously displays the target image 120 at the latest display position in the same scroll speed to make the target image 120 move with the corresponding container image 110 and to achieve the effect of displaying the training image.

Figure 10:
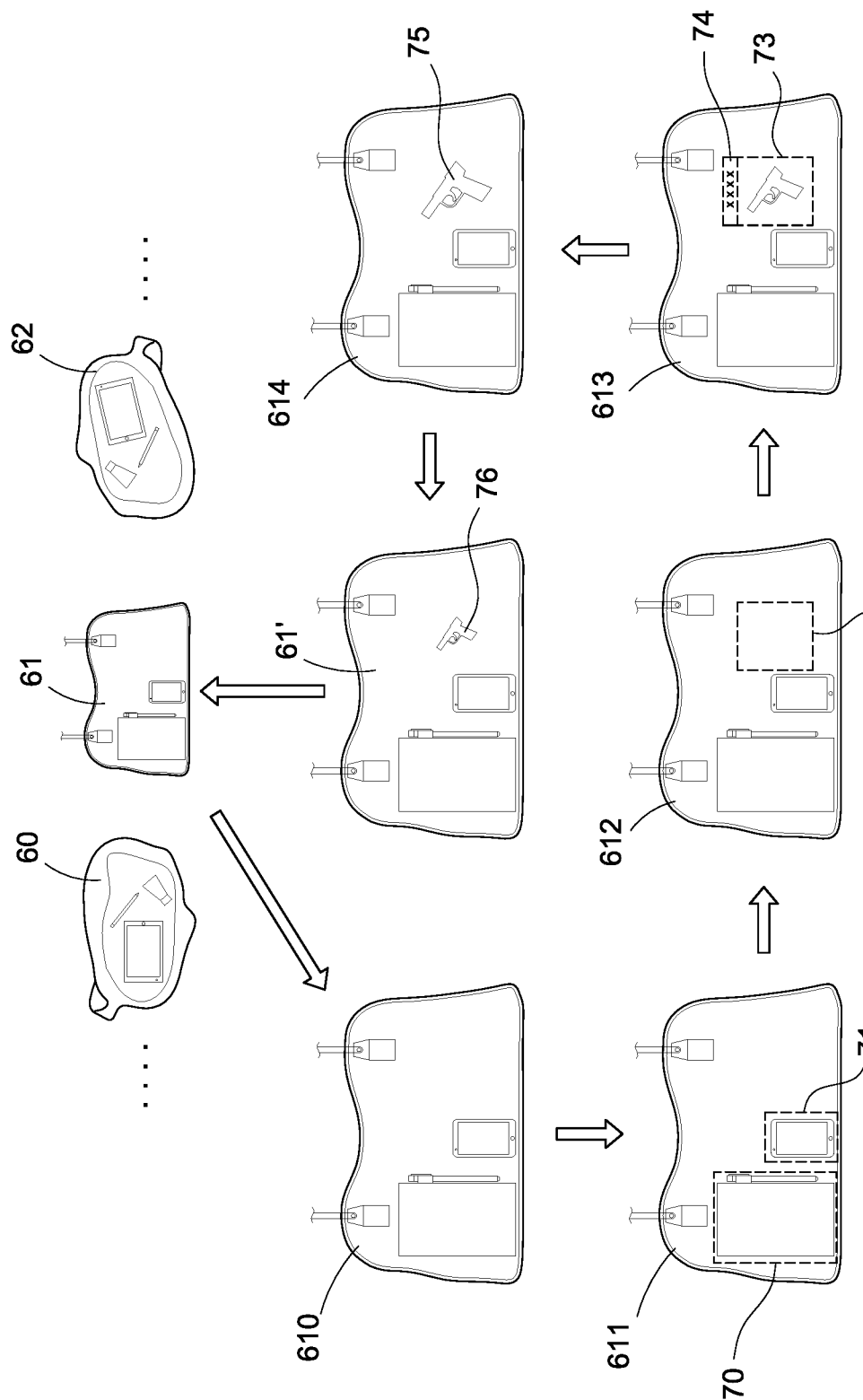
FIG. 10 is a processing schematic view of the target-adding process according to one embodiment of the disclosure.
Figure 11:
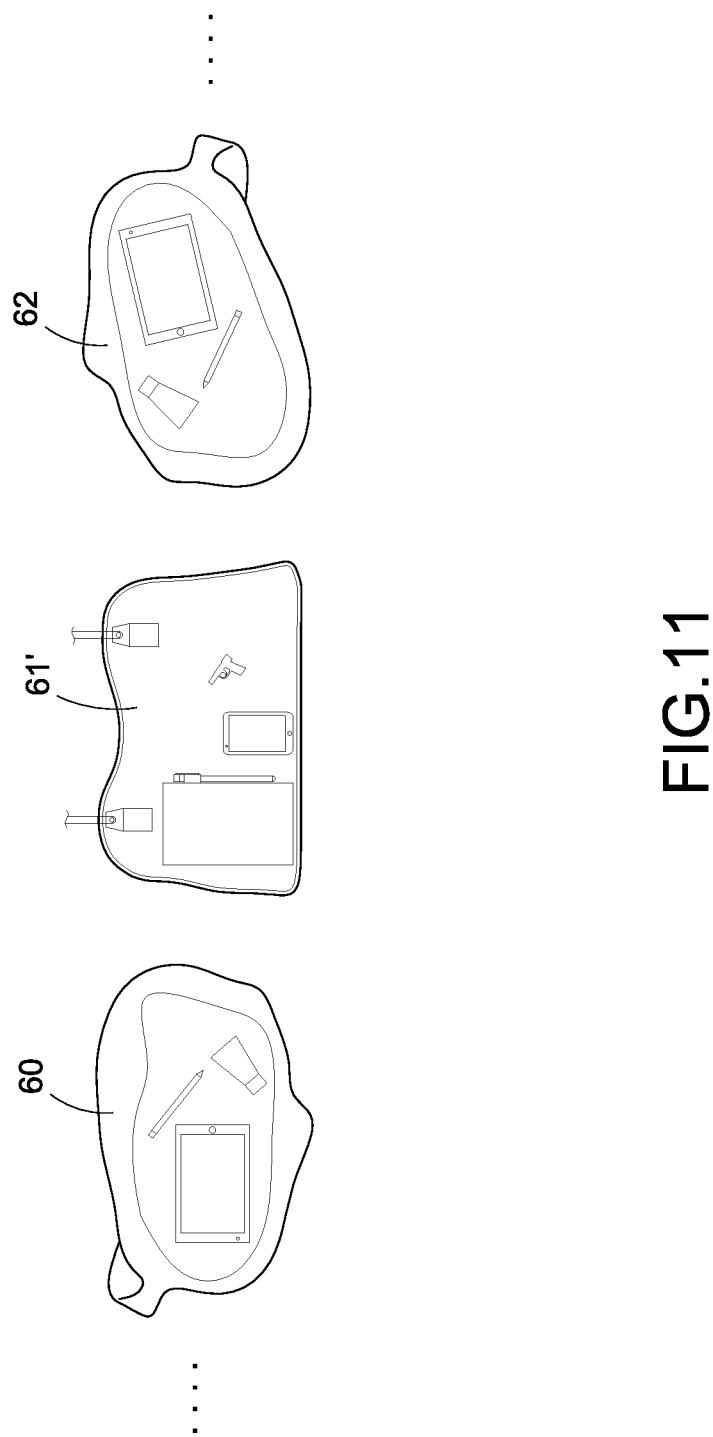
FIG. 11 is a display schematic view of the target-adding process according to one embodiment of the disclosure.

Please refer to FIGS. 10-11, the control module 10 obtains the multiple container images 60-62 in sequence, and selects the container image 61 to execute the target-adding process.

First, the control module 10 loads the container image (as shown in image 610), and executes the (first/second) object-recognizing process on the container image to recognize the multiple original objects 70-71 (as shown in image 611).

Then, the control module 10 may select the target position 72 (as shown in image 612), and adds the target image 73 to the image 612 at the target position 72 (as shown in image 613, the target data 74 may be configured at the same time).

The control module 10 may execute the image-transformation (such as an upscaling process) on the target image 73 to obtain the transformed target image 75 to increase the reliability (as shown in the candidate image 614).

If the reliability of the target image 75 in the candidate image 614 does not meet the threshold condition, the control module 10 may re-execute the image-transformation (such as a scaling-down process and a rotating process) to obtain another transformed target image 76 to increase the reliability again (as shown in image 61').

When the reliability of the transformed target image 76 in the training image 61' meets the threshold condition, the control module 10 may replace the container image 61 with the training image 61' to finish the generation of the training image (as shown in FIG. 11).

Furthermore, the user may watch the container image 60, the training image 61' and the container image 62 displayed in sequence, and perform the operations related to the recognition training.

For example, the user may input a verification operation through the input module 21 to make the control module 10 control the display module 32 to display the target data (answer) of the target image 76 in the training image 61' (such as the displayed training image) for the user to verify whether the made determination is correct.

In another example, the user may input a stop operation or an operating operation through the input module 21 to control the state of the conveyor module 31 to be stopped or continuing to operate, and change the speed of the real-time conveyor information to be stopped or operating.

Moreover, the control module 10 may control the display module 32 to stop scrolling a display screen when the real-time conveyor information is configured to be stopped, and to continue to scroll the display screen when the real-time conveyor information is configured to be operating.

Thus, the disclosure may simulate the real-time object delivery inspection.

The disclosure may automatically generate the training images, and the recognition difficulty of the generated training images may be designated by the user, so as to be suitable for customized recognition training.

The above-mentioned are only some examples in the disclosure, and are not thence restrictive to the scope of claims of the disclosure. Therefore, those who apply equivalent changes incorporating contents from the disclosure are included in the scope of this application, as stated herein.

What is claimed is:

1. An automatic generation method of a training image, comprising:
   a) acquiring a plurality of container images and selecting one of the container images to execute a target-adding process to generate a training image,
   wherein the target-adding process includes:
   a1) acquiring a target image;
   a2) adding the target image to the selected container image as a candidate image;
   a3) computing a reliability of the candidate image, wherein the reliability corresponds to a recognition difficulty of the target image in the candidate image; and
   a4) repeatedly performing the step a1) to the step a3) until the reliability of the candidate image meets a threshold condition for generating the training image; and
   b) recording the training image and a target data, wherein the target data includes at least one of a target category and a target position of the target image;
   wherein the step a3) computing the reliability of the candidate image includes:
   a31) obtaining a category recognition score and a completeness recognition score of the target image in the candidate image by executing a second object-recognizing process, wherein the category recognition score corresponds to a probability of the target category being correctly recognized, and the completeness recognition score corresponds to a probability of the target position being correctly recognized; and
   a32) computing the reliability of the candidate image based on the category recognition score and the completeness recognition score of the target image;
   wherein when the candidate image includes a plurality of the target images, the step a4) includes repeatedly performing the step a1) to the step a3) until the reliability of each target image of the candidate image meets the threshold condition.

2. The automatic generation method according to claim 1, wherein the step a1) includes selecting the target image from a target image database;
   wherein the step a2) includes:
   a21) executing a first object-recognizing process to detect an object position of an original object in the container image;
   a22) setting the target position in the container images based on a position selection rule;
   a23) executing an image-transforming process based on an image transformation rule to transform the target image by at least one of a shape, a brightness, a color, a posture, and a stacking order; and
   a24) adding the transformed target image to the container image at the target position.

3. The automatic generation method of the training image according to claim 2, wherein the first object-recognizing process includes recognizing the original object based on an object detection model established by machine learning;

wherein the position selection rule includes at least one of:

at least a part of the target position overlapping with at least a part of the object position, an area of the target position being equal to or greater than a size of the target image, and the area of the target position being greater than a size of the original object;

wherein the image transformation rule includes at least one of:

selecting at least one function based on the target category of the target image, selecting at least one function based on difference between the container image and the target image, and selecting at least one function based on the target position and the object position.

4. The automatic generation method of the training image according to claim 1, wherein the second object-recognizing process includes:

a311) obtaining a first probability of each target category corresponding to an image block on the target image, determining the target category with a highest first probability, and computing the category recognition score based on the highest first probability; and a312) obtaining a second probability of each range fully covering the target image, determining the target position of the target image based on the range with a highest second probability, and computing the completeness recognition score based on the highest second probability.

5. The automatic generation method of the training image according to claim 1, wherein the step a) includes selecting the container image based on a generation condition; the automatic generation method further comprises:

d1) replacing the selected container image with the training image;

d2) scrolling and displaying the container images and the training image in sequence on a display screen, wherein a scrolling speed is determined based on a conveyor information; and d3) displaying the target data in the training image on the display screen when a verification operation is received.

6. The automatic generation method of the training image according to claim 1, wherein the step a) includes acquiring the container images in sequence by capturing containers, and selecting the container image based on a generation condition; the automatic generation method further comprises:

e1) scrolling and displaying the container images and the training image in sequence on a display screen at a scrolling speed corresponding to a real-time conveyor information;

e2) stopping scrolling on the display screen when the real-time conveyor information is set to stop;

e3) continuing scrolling on the display screen when the real-time conveyor information is set to operate; and e4) displaying the target data in the displayed training image when a verification operation is received;

wherein scrolling the training image includes continuously computing a display position of the target image based on the real-time conveyor information, the selected container image, and the target position so that the target image moves with the selected container image synchronously.

7. The automatic generation method of the training image according to claim 1, further comprising at least one of:

f) recording the training image and the target data in a training image database; and g) adjusting at least one of the threshold condition, a generation condition of the training image, a position selection rule of the target position, and an image transformation rule of the target image, when the recognition difficulty is adjusted.

8. An automatic generation system of a training image, the automatic generation system comprising:

a container image source, including a plurality of container images;

a target image database, including a plurality of target images; and a control module, electrically connected to the container image source and the target image database, the control module including:

a target-adding module, configured to select one of the container images to execute a target-adding process to generate a training image, wherein the target-adding process includes adding the target image to the selected container image as a candidate image;

a target-recording module configured to record the training image and a target data, wherein the target data includes at least one of a target category and a target position of the target image; and a reliability-calculating module, configured to compute a reliability of the candidate image;

wherein the control module is configured to repeatedly execute the target-adding process by the target-adding module until the reliability of the candidate image meets a threshold condition for generating the training image;

wherein the reliability corresponds to a recognition difficulty of the target image in the candidate image, wherein the control module is configured to obtain a category recognition score and a completeness recognition score of the target image in the candidate image by executing a second object-recognizing process, wherein the category recognition score corresponds to a probability of the target category being correctly recognized, the completeness recognition score corresponds to a probability of the target position being correctly recognized;

wherein the control module is configured to compute the reliability of the candidate image based on the category recognition score and the completeness recognition score of the target image;

wherein the control module is configured to repeatedly execute the target-adding process again until the reliability of each target image of the candidate image meets the threshold condition.

9. The automatic generation system of the training image according to claim 8, wherein the control module further includes:

a first object detection module, configured to execute a first object-recognizing process based on an object detection model to detect an object position of an original object in the container image;

a target-selecting module, configured to select the target image from the target image database;

a target-position-selecting module, configured to set the target position in the container image based on a position selection rule;
an image-transforming module, configured to execute an image-transforming process based on an image transformation rule to transform the target image by at least one of a shape, a brightness, a color, a posture, and a stacking order; and
an image-generating module, configured to add the transformed target image to the container image at the target position;
wherein the control module is further configured to read the position selection rule, the image transformation rule, the threshold condition, and the object detection model established by machine learning from a storage module;
wherein the position selection rule includes at least one of:
at least a part of the target position overlapping with at least a part of the object position,
an area of the target position being equal to or greater than a size of the target image, and
the area of the target position being greater than a size of the original object;
wherein the image transformation rule includes at least one of:
selecting at least one function based on the target category of the target image, selecting at least one function based on difference between the container image and the target image, and
selecting at least one function based on the target position and the object position.

10. The automatic generation system of the training image according to claim 8, wherein the second object detection module is configured to obtain a first probability of each target category corresponding to an image block on the target image, determine the target category with a highest first probability, and compute the category recognition score based on the highest first probability;
the second object detection module is configured to obtain a second probability of each range fully covering the target image, determine the target position of the target image based on the range with a highest second probability, and compute the completeness recognition score based on the highest second probability.

11. The automatic generation system of the training image according to claim 8, further comprising a training image database electrically connected to the control module;
wherein the control module is configured to read a generation condition from a storage module, and select the container image based on the generation condition;
wherein the control module further includes:
a conveyor-information-acquiring module, configured to acquire a conveyor information; and
an integration display control module, configured to replace the selected container image with the training image, display and scroll the container images and the training image in sequence on a display screen of a display module and display the target data in the training image on the display screen when a verification operation is received through an input module, wherein a scrolling speed is determined based on the conveyor information;
wherein the target-recording module is configured to record each training image and each corresponding target data in the training image database.

12. The automatic generation system of the training image according to claim 8, wherein the control module is configured to acquire the container images in sequence by controlling an image capture device to capture containers, read a generation condition from a storage module, and select the container image based on the generation condition;
wherein the control module further includes:
a conveyor-information-acquiring module, configured to acquire a real-time conveyor information of a conveyor module; and
an integration display control module, configured to display and scroll the container images and the training image in sequence on a display screen of a display module at a scrolling speed corresponding to the real-time conveyor information, stop scrolling on the display screen when the real-time conveyor information is configured to set to stop, and continue scrolling on the display screen when the real-time conveyor information is configured to set to operate;
wherein the control module is further configured to display the target data in the displayed training image when a verification operation is received through an input module;
wherein the integration display control module is further configured to continuously compute a display position of the target image based on the real-time conveyor information, the selected container image, and the target position so that, the target image moves with the selected container image synchronously.

13. The automatic generation system of the training image according to claim 8, wherein the control module is further configured to adjust at least one of the threshold condition, a generation condition of the training image, a position selection rule of the target position, and an image transformation rule of the target image, when the recognition difficulty is adjusted.

14. A method of automatically generating training images, comprising:
a) acquiring a container image;
b) acquiring a target image;
c) adding the target image to the container image as a candidate image;
d) computing a reliability of the candidate image, wherein the reliability corresponds to a recognition difficulty of recognizing the target image in the candidate image; and
e) repeatedly performing the step b) to the step d) until the reliability of the candidate image meets the threshold condition for generating a training image;
wherein the step d) computing the reliability of the candidate image includes:
d1) obtaining a category recognition score and a completeness recognition score of the target image in the candidate image executing a second object-recognizing process, wherein the category recognition score corresponds to probability of a target category being correctly recognized, and the completeness recognition score corresponds to a probability of a target position being correctly recognized, and
d2) computing the reliability of the candidate image based on the category recognition score and the completeness recognition score of the target image;
wherein when the candidate image includes a plurality of the target images, the step e) includes repeatedly performing the step b) to the step d) until the reliability of each target image of the candidate image meets the threshold condition.

* * * * *